United States Patent
Kiessling et al.

(10) Patent No.: US 6,795,924 B1
(45) Date of Patent: Sep. 21, 2004

(54) SAT BACK CHANNEL SECURITY SOLUTION

(75) Inventors: Johan Kiessling, Stockholm (SE); Than Van Do, Oslo (NO)

(73) Assignee: Telefonaktiebolaget LM Ericsson, Stockholm (SE)

(*) Notice: Subject to any disclaimer, the term of this patent is extended or adjusted under 35 U.S.C. 154(b) by 822 days.

(21) Appl. No.: 09/589,810

(22) Filed: Jun. 9, 2000

(30) Foreign Application Priority Data

Jun. 10, 1999 (NO) .............................................. 992839

(51) Int. Cl.[7] .............................................. H04L 9/00
(52) U.S. Cl. .................... 713/201; 705/64; 709/203
(58) Field of Search ............................. 713/201, 150; 380/277, 41; 705/64

(56) References Cited

U.S. PATENT DOCUMENTS

| | | | |
|---|---|---|---|
| 5,537,474 A | * | 7/1996 | Brown et al. ............... 380/248 |
| 6,367,014 B1 | * | 4/2002 | Proust et al. ............... 713/182 |
| 6,557,753 B1 | * | 5/2003 | Beaujard et al. ............ 235/375 |

OTHER PUBLICATIONS

Leonardi, Robert, Sep. 4, 1997, New Swedish Innovation for Secure Payments via Mobile Telephone, http://www.leonardi.nu/press/english.txt.*
Leonardi, Robert, Sep. 4, 1997, Gemplus Supplies Phrase 2+ SIM Card for MobilSmart[r] in Sweden, http://www.leonardi.nu/press/gemplus.txt.*
Leonardi, Robert, Method for Authorization Check, WO98/37663 A1, Aug. 27, 1998.*
Leiwo, Jussipekka, Security of Data Connections, WO99/27678 A1, Jun. 3, 1999.*

* cited by examiner

Primary Examiner—Ayaz Sheikh
Assistant Examiner—Michael Vaughan

(57) ABSTRACT

The present invention relates to a method and an arrangement for performing secure transactions during an information dialogue between a mobile terminal and a WAP server in a mobile network. The dialogue is made by using USSD. According to the invention there is provided a SAT application on the SIM card of the terminal that signs and encrypts data which are to be transferred in a secure way.

14 Claims, 2 Drawing Sheets

MS: Mobile Station
ME: Mobile Equipment
WML: Wireless Markup Language
Ks: Secret/Private Key
AI: symmetric /assymmetric Cryptographic algorithm
Ap: SAT application

SAT BACK CHANNEL SECURITY SOLUTION

The present invention relates to mobile communication, in particular security solutions for mobile terminals using USSD (Unstructured Supplementary Service Data).

BACKGROUND

For mobile terminals not supporting WAP, e.g. most mobile phones at the moment, there exist the possibility of viewing WAP pages through USSD. In other words, a simulation of a WAP (Wireless Application Protocol) information dialogue can be made by using the USSD capabilities of a Mobile Terminal. The WAP WML (Wireless Markup Language) is browsed in a proxy in the network, and the display of the terminal is made for showing the correct message by sending the equivalent of a "screen dump". WML responses are put together by the proxy from the characters entered by the user on the keypad of the Mobile Terminal. This is summarised in FIG. 1 as follows:

1. The WML server sends the content of a WML page to the Proxy
2. The Proxy decomposes the WML page onto USSD (Unstructured Supplementary Service Data) and sends the data to the ME (Mobile Equipment)
3. The ME sends the received data to the display, which presents said data to the user
4. If an answer from the user is requested, then the user can enter it to the keypad, which forwards the answer to the ME
5. The ME sends the input to the proxy
6. The proxy assembles the received input into WML format and delivers it to the WML server No security feature except for unencrypted passwords is available in this solution. It is not possible to have a secure transaction, i.e. encrypted message exchange in this architecture.

State of the Art

As mentioned above, the only security feature that exists is the unencrypted passwords. This security feature is implemented in the SAT applications, which implement the information browsing.

Problem

The problem with USSD based browsing as described above, is that the level of security is too low for higher values. As the password is communicated unencrypted, it can be discovered during the transfer. Another problem is that the system is awkward in use. Each time a secure transaction is to be performed, the WML server prompts the user for a password, which password has to be entered manually. The password has to be remembered by the user, possibly in addition to a number of passwords for other applications.

The Invention

It is therefore an object of the present invention to provide a method for USSD based browsing, which allows transactions to be performed at a security level hitherto unknown. It is another object of the present invention that said transactions should be easy to perform from the users point of view, and if desired, made fully transparent to the user.

These objects are satisfied in a method as specified in the appended patent claims.

THE DRAWINGS

DESCRIPTION OF THE INVENTION SOLUTION

For SAT (SIM Application Toolkit (ETSI 11.14)) enabled phones, the following solution is suggested.

Figure 2:
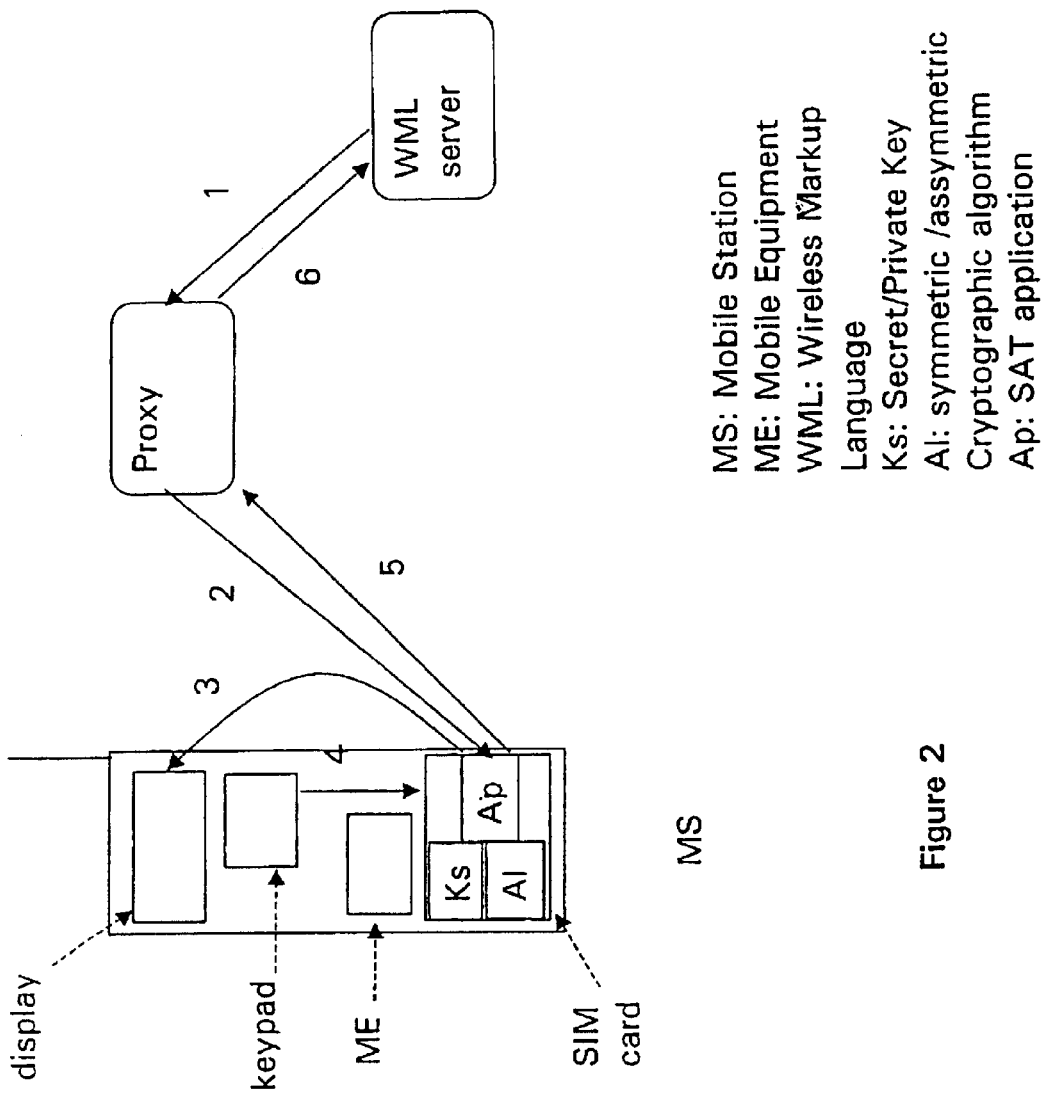
FIG. 2 illustrates a secure WAP exchange according to the invention using an SAT back channel.

As shown in FIG. 2, a secret/private key is stored on the SIM card. Also an algorithm for signing data using a symmetric or an asymmetric technique, as well as an application handling the dialogue with the user and the signing of data is stored on the SIM card.

Figure 1:
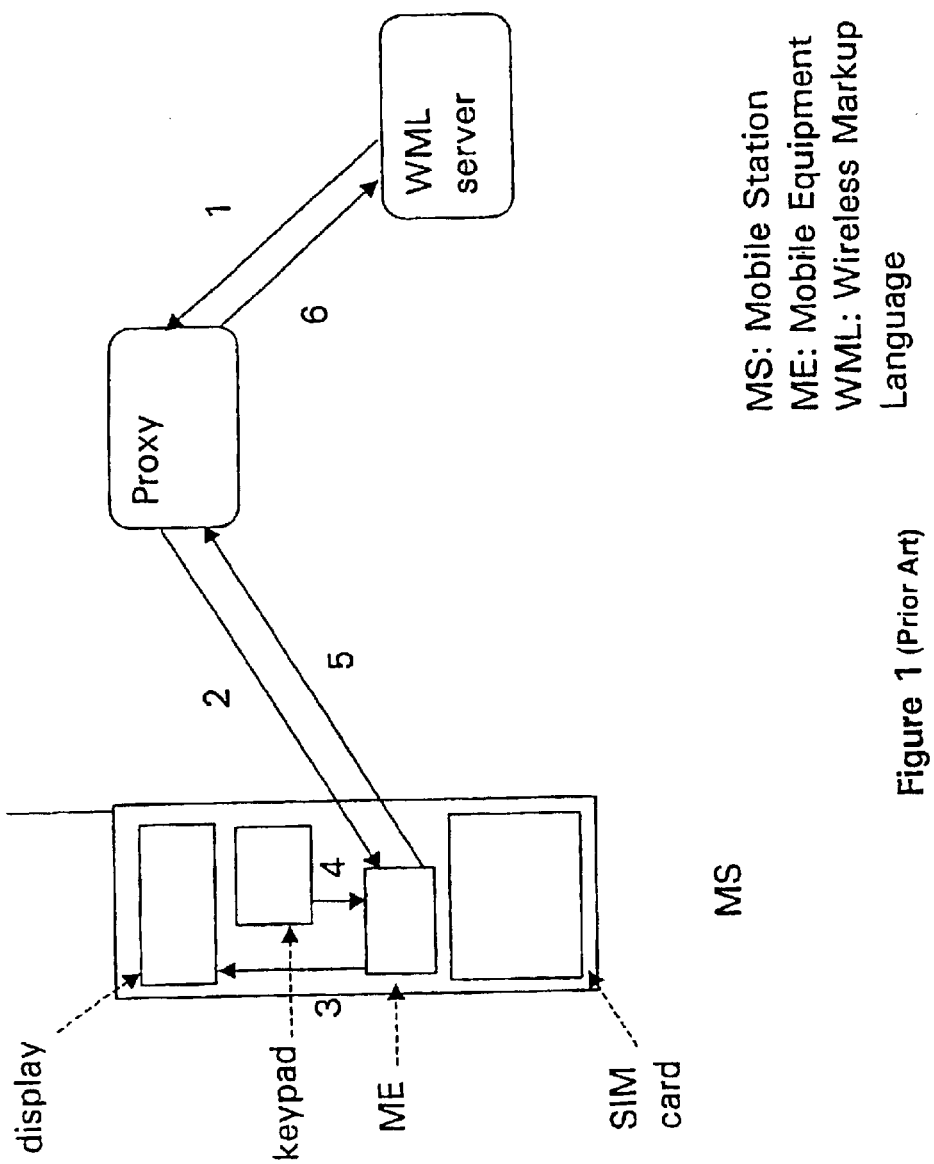
FIG. 1 Illustrates the simulation of a WAP information dialogue using USSD (prior art).

This is summarized in FIG. 2 as follows:

1. When information browsing through the mechanism described above and in FIG. 1, has reached a point where a secure transaction should be established, for example the WML server asking explicitly for a secure transaction.
2. The USSD dialogue is terminated. Instead the proxy enters the details of the transaction to be secured into an SMS, and sends it to the SIM card of the Mobile Terminal where the SAT application is activated.
3. The application using SAT commands shows the details of the transaction to the user, and prompts for an "OK" to the transaction.
4. If the user agrees (optionally by entering a PIN), the application signs the data (or a hash of the data) with the secret/private key using the correct algorithms.
5. The signed data is then returned to the proxy by using SMS or USSD as a bearer.
6. Then the proxy either verifies the signature or passes it on to the appropriate instance that shall handle the verification.

Merits of the Invention

A very high level of security is achieved in combination with a very flexible information browsing solution.

Since it only has to handle signing of data and no information or menu handling, the application on the SIM card can be made very thin and flexible. Thus, it can be made to work in many different applications.

The system handling the information browsing, and the system handling the security of the transactions are separated. They can be updated, changed etc. independently.

Abbreviations

Application An application consists of a set of security mechanisms, files, data and protocols (excluding transmission protocols)

ETSI European Telecommunication Standard Institute

HDML Hand-held Device Markup Language An abbreviated version of HTML designed to enabling wireless pagers, cellular phones and other hand-held devices to obtain Web pages HTML HyperText Markup Language The document format used on the World Wide Web. Web pages are built with HTML tags or codes embedded in the text. HTML defines the page layout, fonts and graphic elements, as well as the hypertext links to other documents on the Web.

PIN Personal Identification Number

Proxy It is also called a "proxy server" or "application level gateway". It is an application that breaks the connection between the sender and the receiver. All input is forwarded to a different port, closing a straight path between two networks and preventing a hacker from obtaining internal addresses and details of a private network.

SAT SIM Application Toolkit SAT is a set of applications and related procedures, which may be used during a GSM session.

SIM Subscriber Identity Module (Mobile)

SMS Short Message Service

USSD Unstructured Supplementary Service Data USSD is a mechanism that allows user interaction between GSM Public Land Mobile Network applications and a Mobile Station in a transparent way through the network.

WAP Wireless Application Protocol WAP is a wireless standard from Motorola, Ericsson and Nokia for providing mostly cellular phones with access to e-mail and text-based Web pages. WAP uses the Wireless Markup Language (WML), which is the WAP version of HDML.

What is claimed is:

1. Method for performing a secure transaction during an information dialogue between a mobile terminal and a server in a network, wherein said server supports WML, comprising the steps of:

receiving the content of a WML page from said server by a proxy;

decomposing the WML page onto USSD and sending the data to the mobile terminal by said proxy by establishing a USSD dialogue with said mobile terminal and wherein said WML page is to be displayed by said mobile terminal;

determining that a secure transaction should be established, and in response to said determination, the established USSD dialogue is terminated with said mobile terminal;

entering the details of a transaction to be secured into an SMS message and sending said SMS message to the SIM card of the mobile terminal causing SAT application within the mobile terminal to be activated;

receiving the requested secured data from the mobile station by said proxy, said requested secured data encrypted with a secret/private key;

verifying the received secured data by said proxy; assembling the secured data into WML format and delivering the data to the server.

2. Method according to claim 1, wherein that said step of receiving said secured data further comprises entering a PIN code by said mobile terminal.

3. Method according to claim 1, wherein that said secured data is hash coded.

4. Method according to claim 1, wherein that the secured data is received by the proxy using SMS as a bearer.

5. Method according to claim 1, wherein that the secured data is received by the proxy using USSD as a bearer.

6. Method according to claim 1, wherein that the secured data is verified by the proxy.

7. Method according to claim 1, wherein that the secured data is passed on to an external instance for verification by the proxy.

8. Arrangement for performing a secure transaction during an information dialogue between a mobile terminal and a server in a network, comprising:

a WAP server supporting WML and connected to said network, said information dialogue is simulated by using USSD within said network;

a proxy, further comprising:

means for receiving the the content of a WML page from said server;

means for decomposing the WML page onto USSD and sending the USSD to the mobile terminal, said WML sage to be displayed by said mobile terminal;

means for terminating said USSD dialogue when a secure transaction is to be established;

means for entering the details of the transaction to be secured into an SMS message and sending the SMS message to the SIM card of the mobile terminal causing a SAT application on said SIM card to be activated;

means for receiving secured data from the mobile station;

means for verifying for verifying the received secured data;

means for assembling the received secured data into WML format and delivering the received data to the web server.

9. Arrangement according to claim 8, wherein that said SAT application is arranged to prompt the user for entering a PIN code.

10. Arrangement according to claim 8, wherein that said SAT application is arranged to hash code said data before signing.

11. Arrangement according to claim 8, wherein that the secured data is received by said proxy using SMS as a bearer.

12. Arrangement according to claim 8, wherein that the secured data is received by said proxy using USSD as a bearer.

13. Arrangement according to claim 8, wherein that the proxy is arranged to verify the signed data.

14. Arrangement according to claim 8, wherein that the proxy is arranged to pass the data to an external instance for verification.

* * * * *